US011780417B2

(12) United States Patent
Park

(10) Patent No.: US 11,780,417 B2
(45) Date of Patent: Oct. 10, 2023

(54) ELECTRIC BRAKE DEVICE

(71) Applicant: HYUNDAI MOBIS CO., LTD., Seoul (KR)

(72) Inventor: Si Woo Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 330 days.

(21) Appl. No.: 16/952,417

(22) Filed: Nov. 19, 2020

(65) Prior Publication Data
US 2021/0146898 A1 May 20, 2021

(30) Foreign Application Priority Data

Nov. 20, 2019 (KR) .................. 10-2019-0149870

(51) Int. Cl.
*B60T 8/40* (2006.01)
*B60T 13/68* (2006.01)

(52) U.S. Cl.
CPC .......... *B60T 8/4081* (2013.01); *B60T 13/686* (2013.01); *B60T 2220/04* (2013.01); *B60T 2270/82* (2013.01); *B60Y 2400/81* (2013.01)

(58) Field of Classification Search
CPC ...... B60T 8/409; B60T 8/4081; B60T 8/4086; B60T 2270/82; B60T 13/686; B60T 2220/04
See application file for complete search history.

(56) References Cited

U.S. PATENT DOCUMENTS

| 4,214,737 | A | * | 7/1980 | Blatt | F16F 9/44 188/289 |
| 5,544,948 | A | * | 8/1996 | Schmidt | B60T 7/042 60/566 |
| 6,135,735 | A | * | 10/2000 | Siegel | F04B 53/1002 417/567 |
| 6,139,119 | A | * | 10/2000 | Otomo | B60T 8/3655 303/DIG. 11 |
| 6,347,518 | B1 | * | 2/2002 | Kingston | B60T 8/4081 92/84 |

(Continued)

FOREIGN PATENT DOCUMENTS

JP 2004330966 A * 11/2004
JP 2007030756 A * 2/2007

(Continued)

*Primary Examiner* — Bradley T King
(74) *Attorney, Agent, or Firm* — Morgan, Lewis & Bockius LLP

(57) ABSTRACT

An electric brake device is disclosed. The electric brake device includes a reservoir configured to store brake oil; a reaction force cylinder fluidically communicating with the reservoir and configured to change a pedal effort and a pressure of the brake oil in operative connection with a movement of a pedal; a wheel brake mechanism configured to restrain rotation of wheels of a vehicle in connection with the operation of the reaction force cylinder; and a pedal effort adjustment stopper configured to adjust a change in magnitude of the pedal effort according to the movement of the pedal, the pedal effort adjustment stopper comprising a coupling body mounted on at least one side of the reaction force cylinder and one or more pedal effort adjusters connected to the coupling body and movable in a longitudinal direction of the reaction force cylinder.

8 Claims, 11 Drawing Sheets

(56) References Cited

U.S. PATENT DOCUMENTS

| | | | |
|---|---|---|---|
| 11,192,530 B1* | 12/2021 | Koo | B60T 7/06 |
| 11,192,534 B2* | 12/2021 | Kunz | B60T 8/4086 |
| 11,312,349 B2* | 4/2022 | Park | B60T 8/409 |
| 2014/0117602 A1* | 5/2014 | Jeon | B60T 11/18 |
| | | | 267/170 |
| 2014/0361473 A1* | 12/2014 | Ryu | B60T 7/042 |
| | | | 267/140.2 |
| 2015/0165861 A1* | 6/2015 | Allen | F16F 9/44 |
| | | | 267/64.26 |
| 2015/0375721 A1* | 12/2015 | Lee | B60T 8/4086 |
| | | | 303/113.4 |
| 2019/0232934 A1* | 8/2019 | Weh | B60T 8/409 |
| 2021/0323520 A1* | 10/2021 | Yokoyama | G05G 5/03 |
| 2022/0219659 A1* | 7/2022 | Wagner | B60T 7/042 |

FOREIGN PATENT DOCUMENTS

| | | |
|---|---|---|
| KR | 10-1000165 B1 | 12/2010 |
| KR | 10-1853771 B1 | 5/2018 |
| KR | 10-1922477 B1 | 2/2019 |
| KR | 10-2002608 B1 | 7/2019 |

\* cited by examiner

ELECTRIC BRAKE DEVICE

CROSS-REFERENCE TO RELATED APPLICATION

This application claims priority to and the benefit of Korean Patent Application No. 10-2019-0149870, filed on Nov. 20, 2019, the disclosure of which is incorporated herein by reference in its entirety.

BACKGROUND OF THE INVENTION

1. Field of the Invention

The present disclosure relates to an electric brake device, and more particularly, to an electric brake device for generating braking force corresponding to pedal effort applied to a pedal simulator.

2. Description of the Related Art

The statements in this section merely provide background information related to the present disclosure and may not constitute prior art.

In general, an electric brake device adjusts the braking pressure on each wheel using a hydraulic modulator after a pedal pressure of a driver is sensed through a sensor.

The electric brake device includes a sensor configured to detect a pedal stroke to recognize braking pressure desired by the driver, and a pedal simulator configured to allow the driver to feel the pedal pressure similar to that of a general hydraulic brake device.

When the driver presses the brake pedal in a normal driving state, the internal pressure of the pedal simulator is changed. The changed pressure is transmitted to the pedal to provide a reaction feeling to the driver.

A controller determines the driver's required braking force obtained through the pedal stroke sensor and the pressure sensor, and drives a separate wheel brake mechanism to generate braking force on the wheel brake.

Background technology of the present disclosure is disclosed in Korean Patent Application Publication No. 2015-0040714 (published on Apr. 15, 2015, entitled "Electronic hydraulic brake device").

The pedal simulator is mechanically set to simulate the braking feeling that is the same as that of a general hydraulic brake. In other words, since typical drivers are accustomed to the braking feeling of a vehicle equipped with a conventional general hydraulic brake having a master cylinder-booster assembly, the pedal simulator implements the braking feeling such that the driver feels the minimized difference of the electric brake from the general hydraulic brake.

SUMMARY OF THE INVENTION

In the electric brake device as described above, the driver's experience and preference in terms of braking feeling or pedal effort are extremely subjective and differ among the drivers. However, the pedal simulator of the conventional electric brake device has a limitation in that it can provide only one type of braking feeling preset by design and manufacture.

Therefore, the present disclosure has been made in view of the above problems based on fact that the braking feeling experienced in the conventional vehicle and preferred braking feeling may differ among drivers, it is an object of the present disclosure to provide a pedal simulator capable of changing the braking feeling through mechanical adjustment and an electric brake device including the same.

It is another object of the present disclosure to provide a pedal simulator capable of easily changing braking feeling with a simple mechanism structure, and an electric brake device including the same.

Additional advantages, objects, and features of the disclosure will be set forth in part in the description which follows and in part will become apparent to those having ordinary skill in the art upon examination of the following or may be learned from practice of the disclosure.

In accordance with the present disclosure, an electric brake device includes a reservoir configured to store brake oil; a reaction force cylinder fluidically communicating with the reservoir and configured to change a pedal effort and a pressure of the brake oil in operative connection with a movement of a pedal; a wheel brake mechanism configured to restrain rotation of wheels of a vehicle in connection with the operation of the reaction force cylinder; and a pedal effort adjustment stopper configured to adjust a change in magnitude of the pedal effort according to the movement of the pedal, the pedal effort adjustment stopper comprising a coupling body mounted on at least one side of the reaction force cylinder and one or more pedal effort adjusters connected to the coupling body and movable in a longitudinal direction of the reaction force cylinder.

The pedal effort adjustment stopper includes a coupling body mounted on at least one side of the reaction force cylinder and one or more pedal effort adjusters connected to the coupling body and movable in a longitudinal direction of the reaction force cylinder.

Other specific details of the present disclosure are included in the detailed description and drawings.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Figure 1:
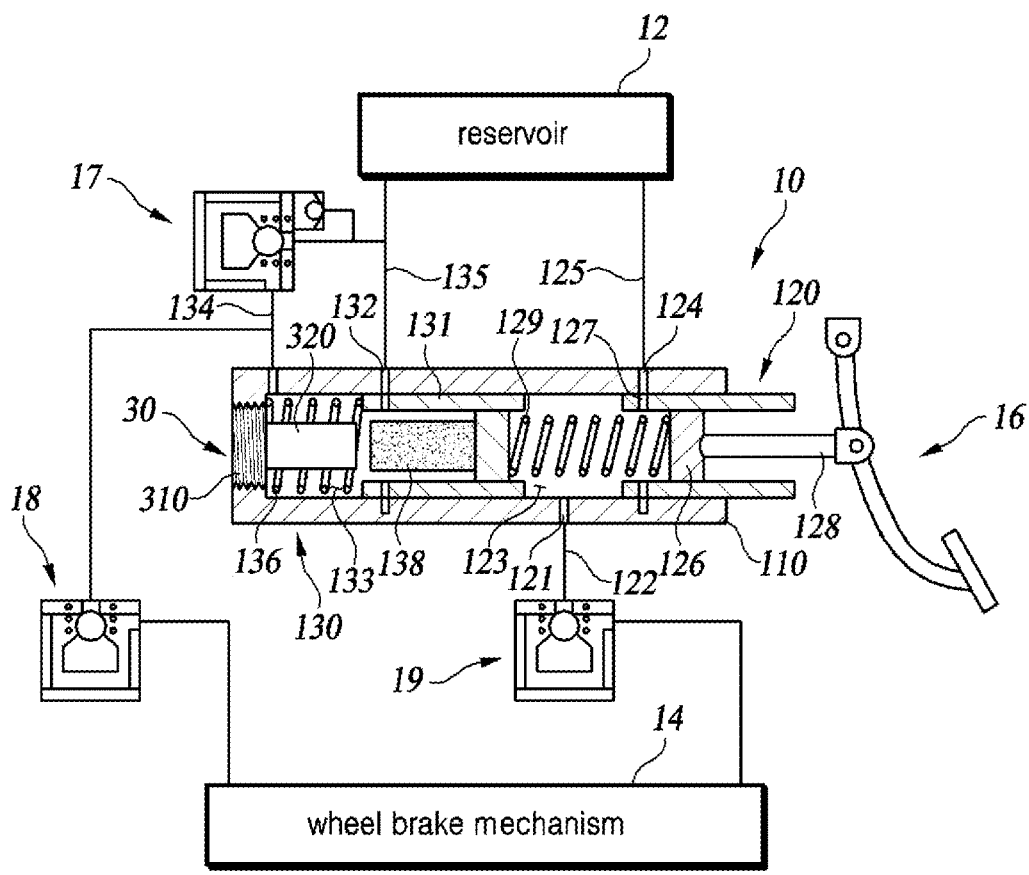
FIG. 1 is a schematic view showing the structure of an electric brake device according to an embodiment of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein may be omitted to avoid obscuring the subject matter of the present disclosure.

For clarity and convenience of description, the lines or the elements shown in the drawings have not necessarily been drawn to scale.

Hereinafter, embodiments of the present disclosure will be described in detail with reference to the accompanying drawings.

Figure 2:
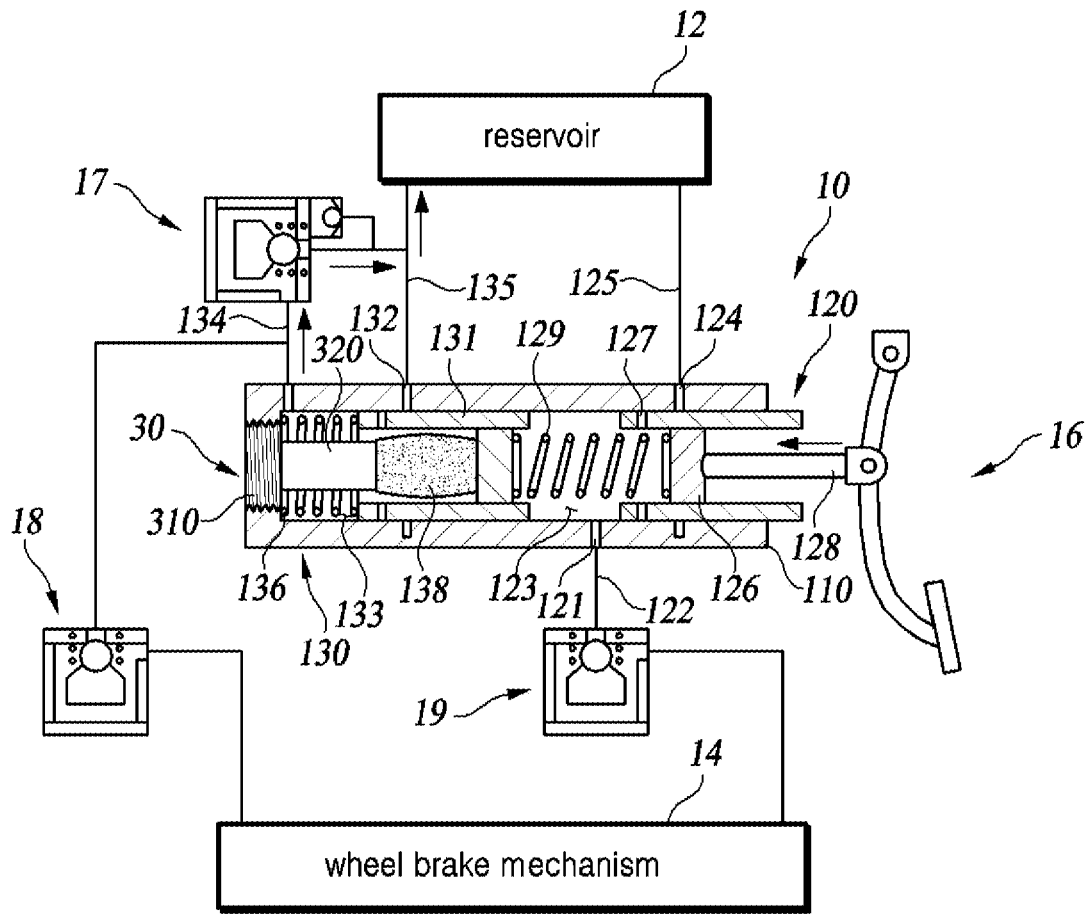
FIG. 2 is a schematic view illustrating a case where a user's pedal effort is applied to the electric brake device according to FIG. 1.

FIG. 1 is a schematic view showing the structure of an electric brake device according to an embodiment of the present disclosure. FIG. 2 is a schematic view illustrating a case where a user's pedal effort is applied to the electric brake device according to FIG. 1.

Referring to FIGS. 1 and 2, the electric brake device 1 according to the embodiment of the present disclosure includes a reservoir 12 configured to store brake oil, a reaction force cylinder 10 fluidically communicating with the reservoir 12 and configured to change a pedal effort and a pressure of the brake oil in operative connection with a movement of a pedal 16, a reaction force valve 17 disposed between the reservoir 12 and the reaction force cylinder 10 to control movement of the brake oil, a wheel brake mechanism 14 configured to restrict rotation of wheels in connection with operation of the reaction force cylinder 10, a brake valve 18 disposed in a connection pipe 134 connecting the wheel brake mechanism 14 to the reaction force cylinder 10 to control the movement of the brake oil, and a pedal effort adjustment stopper 30 mounted on one side of the reaction force cylinder 10.

The reservoir 12 is disposed to compensate for insufficient liquid when the volume of the liquid changes according to a change in temperature in the system that uses the liquid, and is also called a reserve tank.

The brake oil is stored inside the reservoir 12 employed for the electric brake device 1.

The pedal 16 rotated by an operation of the driver is connected to the reaction force cylinder 10.

The reaction force cylinder 10 is configured to provide repulsive force corresponding to the movement of the pedal 16 in operative connection with the movement of the pedal 16. This repulsive force may be defined as a feeling of resistance or pedal effort caused when the driver presses the brake pedal 16.

The reaction force cylinder 10 according to the present disclosure is not limited to the structure according to the embodiment shown in FIGS. 1 and 2. The structure and function of the reaction force cylinder 10 may be implemented into various modified forms within the technical idea of changing the pedal effort and the pressure of the brake oil inside.

In an embodiment of the present disclosure, the reaction force cylinder 10 includes a hollow main cylinder 110 having an operation space 123 therein, a first pressure generator 120 positioned inside the main cylinder 110 and configured to pressurize the brake oil inside the cylinder in connection with operation of the pedal 16, and a second pressure generator 130 arranged neighboring the first pressure generator 120 inside of the main cylinder 110 and configured to pressurize the inner brake oil in connection with movement of the first pressure generator 120.

The operation space 123 is provided inside the main cylinder 110. In an embodiment of the present disclosure, the main cylinder 110 is formed to be open on both sides.

The first pressure generator 120 is arranged on one side of the main cylinder 110 (right side in FIG. 1), and a second pressure generator 130 is arranged on the opposite side of the main cylinder 110 (left side in FIG. 1).

The first pressure generator 120 is configured to pressurize the brake oil inside in operative connection with rotation of the pedal 16, and to press the second pressure generator 130 toward the other side of the main cylinder 110 in response to the pressurization of the incompressible oil.

According to an embodiment, the first pressure generator 120 includes a first piston 126 hinged to the pedal 16 and configured to linearly move along the inner side of the main cylinder 110, a pedal rod 128 having one end connected to the pedal 16 and an opposite end connected to the first piston part 126, and a first elastic member 129 arranged between the first piston part 126 and the second pressure generator 130 to elastically support the first piston 126.

As shown in FIG. 1, a first connection hole 127 is formed in the body of the first piston 126. The first connection hole 127 communicates with the cylinder connection hole 124 of the main cylinder 110 when the first piston 126 is positioned at an initial position, that is, when the driver does not press the brake.

In one embodiment of the present disclosure, the first elastic member 129 is a coil spring. One side of the first elastic member 129 is supported on the first piston 126, and the opposite side of the first elastic member 29 is supported on the second pressure generator 130.

The second pressure generator 130 is arranged inside the main cylinder 110 so as to be adjacent to the first pressure generator 120, and is configured to pressurize the brake oil inside the second pressure generator 130 in operative connection with linear movement of the first pressure generator 120 and to provide resistance against the linear movement of the first pressure generator 130.

According to an embodiment of the present disclosure, the second pressure generator 130 includes a second piston 131 configured to support the first elastic member 129 and linearly move along the inner side of the main cylinder 110, a second elastic member 136 supported on at least a part of the pedal effort adjustment stopper 30 and configured to elastically support the second piston 131, and a reaction damper 138 mounted on the second piston 131 and configured to be compressed between at least another part of the stopper 30 and the second piston 131 during movement of the second piston 131 to form a reaction force against the movement of the second piston 131.

The second piston 131 is arranged to linearly move inside the main cylinder 110. A second connection hole 132 is formed in the body of the second piston 131. When the second piston 131 is at the initial position, the second connection hole 132 communicates with the cylinder connection hole 124.

In one embodiment of the present disclosure, the second piston 131 has a C-shaped cross section. The reaction damper 138 is located inside the second piston 131. One side of the second piston 131 contacts the first elastic member 129 and the opposite side thereof contacts the second elastic member 136.

In one embodiment of the present disclosure, the pedal effort adjustment stopper 30 includes a coupling body 310 coupled to the opposite side of the main cylinder 110, and at least one pedal effort adjuster 320 connected to the coupling body 310 and configured to be movable along the longitudinal axis of the reaction force cylinder 10.

The pedal effort adjustment stopper 30 is at least partially inserted into the second pressure generator 130. In addition, the second elastic member 136 is supported on the outer surface of the pedal effort adjustment stopper 30 in the first pressure generator 120, and at least a part of the pedal effort adjuster 320 protrudes toward the second piston 131 along the longitudinal axis.

As shown in FIG. 2, the reaction damper 138 is arranged between the second piston 131 and the protruding end of the pedal effort adjuster 320. When the second piston 131 is moved along the longitudinal axis (from right to left in FIG. 2), the reaction damper 138 is compressed to form pedal effort for rotation of the pedal 16.

According to an embodiment of the present disclosure, the reaction damper 138 may be formed of natural rubber, synthetic rubber, or flexible plastic, and forms pedal effort by the elastic restoring force.

In an embodiment of the present disclosure, the pedal effort adjuster 320 is configured such that the degree of protrusion thereof toward the reaction damper 138 in the second pressure generator 130 may be adjusted. That is, the pedal effort adjuster 320 is configured to make a relative movement from the coupling body 310 along the longitudinal axis.

The magnitude of the pedal effort according to the degree of rotation of the pedal 16 may depend on the degree of protrusion of the pedal effort adjuster 320.

The structure of the pedal effort adjustment stopper 30 and the corresponding operation will be described in detail with the accompanying drawings.

In one embodiment of the present disclosure, the reaction force cylinder 10 and the reservoir 12 are connected by a first pipe 125 and a second pipe 135, and the reaction force cylinder 10 and the wheel brake mechanism 14 are connected by the connection pipe 134. The reaction valve 17 is arranged between the connection pipe 134 and the second pipe 135.

The reaction valve 17 may be arranged to adjust the state of fluidic communication between the reservoir 12 and the second pressure generator 130 of the reaction force cylinder 10, and the type and structure thereof are not limited.

In an embodiment of the present disclosure, the reaction valve 17 is operated as a normally closed type valve, and the pipeline may be opened according to a control signal. That is, the reaction valve 17 closes the pipe between the second pressure generator 130 and the reservoir 12 when an external control signal, for example, a voltage is not applied. The reaction valve 17 opens the pipe between the pressure generator 130 and the reservoir 12 when an external control signal is applied, for example, when the vehicle is running normally.

The first brake valve 18 is mounted on the connection pipe 134 between the wheel brake mechanism 14 and the second pressure generator 130 of the reaction force cylinder 10, and the second brake valve 19 is mounted on the connection pipe 122 between the wheel brake mechanism 14 and the first pressure generator 120 of the reaction force cylinder 10.

According to an embodiment of the present disclosure, the first brake valve 18 and the second brake valve 19 are operated as normally open type valves, and may close a pipeline according to a control signal. That is, the first brake valve 18 and the second brake valve 19 close the pipeline between the second pressure generator 130 and the reservoir 12 when an external control signal, for example, a voltage is applied. The first brake valve 18 and the second brake valve 19 open the pipeline between the pressure generator 130 and the reservoir 12 when an external control signal is not applied, for example, when the brake system of the vehicle is out of order or the engine is turned off.

In one embodiment of the present disclosure, the opening and closing operations of the reaction valve 17 are opposite to those of the first and second brake valves 18 and 19. That is, when the reaction valve 17 is open, the first and second brake valves 18 and 19 remain closed. When the reaction valve 17 remains closed, the first and second brake valves 18 and 19 remain open.

The wheel brake mechanism 14 corresponds to all the components capable of restraining the rotation of the wheels in connection with the operation of the reaction force cylinder 10 to brake the vehicle.

In one embodiment of the present disclosure, the wheel brake mechanism 14 includes an electric hydraulic brake mechanism configured to generate braking force corresponding to a measured value of a sensor (not shown) that measures the linear movement of the first piston 126 and the second piston 131.

The wheel brake mechanism 14 is configured to apply braking force to the wheels using the hydraulic pressure of brake oil introduced through the first and second brake valves 18 and 19 opened in the fail-safe mode.

In the fail-safe mode, the reaction damper 138 is also compressed, and accordingly, the brake oil pressure of the second pressure generator 130 is lower than the brake oil pressure of the first pressure generator 120.

When the vehicle is braking, the center of gravity of the vehicle is shifted to the front of the vehicle, and the rear wheels of the vehicle require less braking force than the front wheels of the vehicle. Accordingly, the brake oil in the first pressure generator 120 is supplied to the wheel brake mechanism 14 configured to restrain the front wheels of the vehicle, and the brake oil in the second pressure generator 130 is supplied to the wheel brake mechanism 14 configured to restrain the rear wheels of the vehicle.

Figure 3:
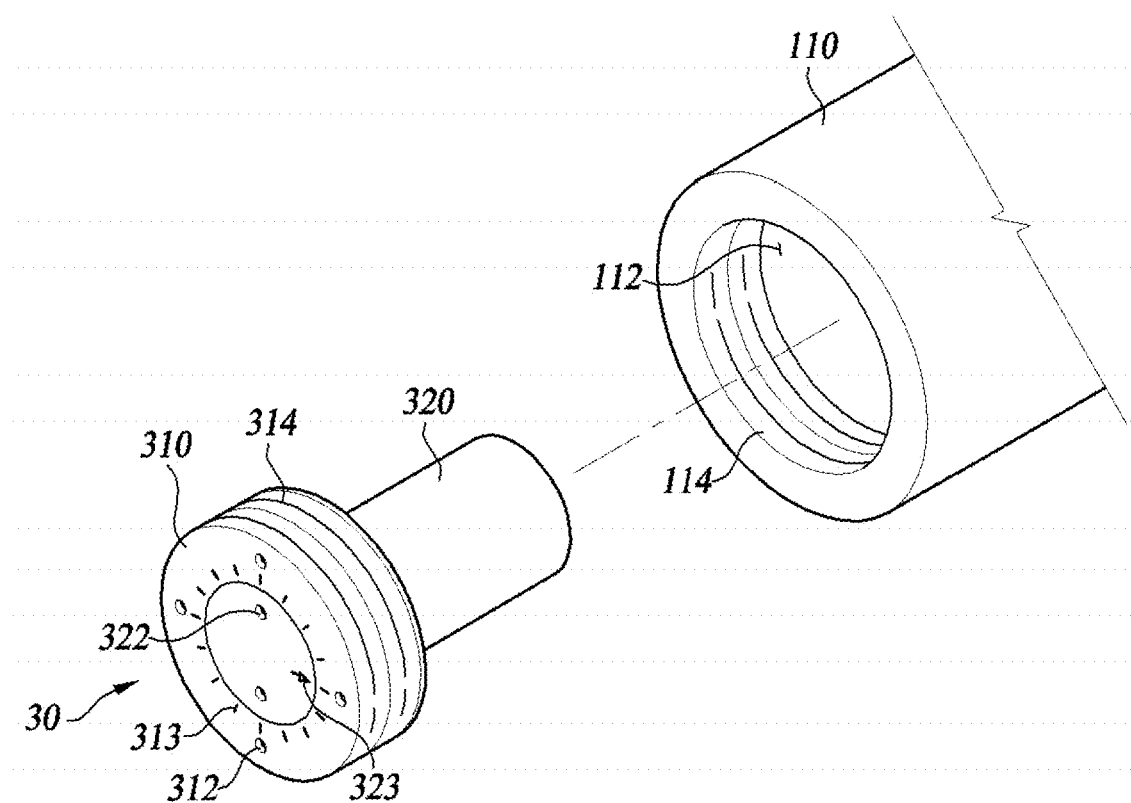
FIG. 3 is an exploded perspective view showing a pedal effort adjustment stopper of the electric brake device according to the embodiment of the present disclosure separated from one end of a reaction force cylinder.

FIG. 3 is an exploded perspective view showing the pedal effort adjustment stopper 30 of the electric brake device 1 according to the embodiment of the present disclosure separated from one end of the reaction force cylinder 10.

Referring to FIG. 3, the pedal effort adjustment stopper 30 according to the embodiment of the present disclosure is configured to be coupled to one side of the reaction force cylinder 10, for example, one end of the main cylinder 110.

In one embodiment, the pedal effort adjustment stopper 30 includes a coupling body 310 and a pedal effort adjuster 320 configured to be fastened to the coupling body 310.

The coupling body 310 may be formed in an annular shape having a body fastening hole therein. In addition, the coupling body 310 includes body-side male threads 314 formed along an outer circumferential surface thereof and body-side female threads 316 formed along an inner circumferential surface thereof. The coupling body 310 may be inserted into the cylinder-side fastening hole 112 formed at one end of the reaction force cylinder 10. At this time, the body-side male threads 314 of the coupling body 310 may be screw-coupled to the cylinder-side female threads 114 formed in the reaction force cylinder 10.

In the illustrated embodiment, the second elastic member 136 of the second pressure generator 130 is supported on one surface of the coupling body 310.

In one embodiment of the present disclosure, the coupling body 310 includes an exposed surface at least partially exposed to the outside of the reaction force cylinder 10. The coupling body 310 also includes one or more first mechanism fasteners 312 formed in the exposed surface.

While it is illustrated in the embodiment that the first mechanism fasteners 312 are circular grooves formed on the exposed surface of the coupling body 310 and disposed on four sides, the present disclosure is not limited thereto. In accordance with the present disclosure, the first mechanism fasteners 312 may be formed as protrusions, grooves, and an appropriate combination thereof formed on the exposed surface, and the shape thereof is not limited.

The pedal effort adjuster 320 may have an elongated column shape, for example, a cylindrical shape, and includes projection male threads 324 formed on at least a portion of the outer circumferential surface thereof. However, the present disclosure is not limited thereto, and the pedal effort adjuster 320 may have a bolt shape having a T-shaped cross section.

The pedal effort adjuster 320 may be inserted into the body-side fastening hole of the coupling body 310. At this time, the projection male threads 324 of the pedal effort adjuster 320 may be screw-coupled to the body-side female threads of the coupling body 310.

In one embodiment of the present disclosure, the pedal effort adjuster 320 includes an exposed surface at least partially exposed to the outside of the reaction force cylinder 10. The pedal effort adjuster 320 also includes one or more second mechanism fasteners 322 formed on the exposed surface.

While it is illustrated in the embodiment that the second mechanism fasteners 322 are formed on the exposed surface of the pedal effort adjuster 320 as circular grooves on opposite sides, the present disclosure is not limited thereto. Similar to the first mechanism fasteners 312, the second mechanism fasteners 322 may be formed as protrusions, grooves, and a combination thereof, and the shape thereof is not limited.

The coupling body 310 may include a first adjustment mark 313 positioned on the exposed surface thereof, and the pedal effort adjuster 320 may include a second adjustment mark 323 positioned on the exposed surface thereof. In one embodiment of the present disclosure, the first adjustment mark 313 may be formed as measurement markings arranged along at least one circle, and the operator may estimate the degree of adjustment of the pedal effort based on the degree of relative rotation of the first adjustment mark 313 to the second adjustment mark 323.

Figure 4A:
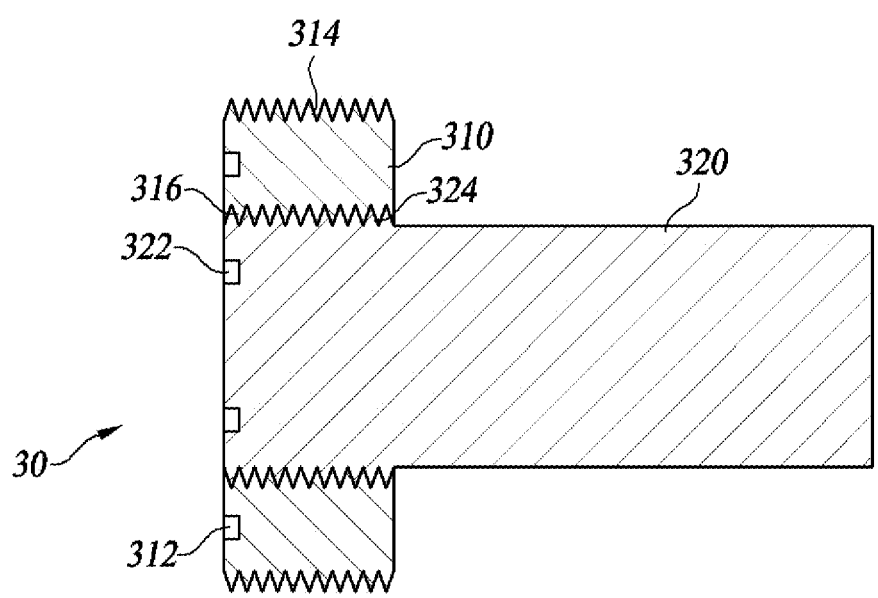
FIG. 4A is a cross-sectional view of a pedal effort adjustment stopper according to an embodiment of the present disclosure.

FIG. 4A is a cross-sectional view of the pedal effort adjustment stopper 30 according to an embodiment of the present disclosure.

Figure 4B:
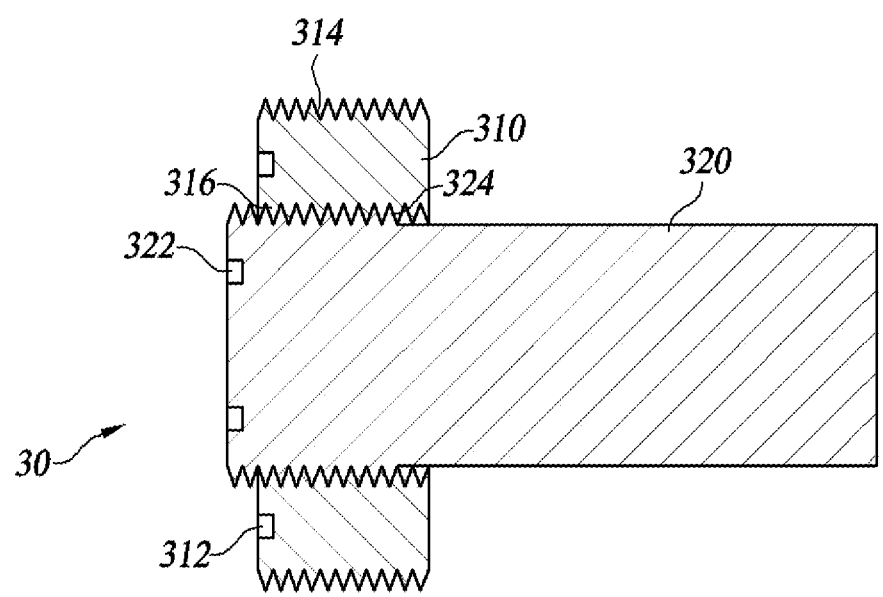
FIG. 4B shows an example in which the pedal effort adjustment stopper according to the embodiment of the present disclosure is adjusted to relieve the pedal effort.

FIG. 4B shows an example in which the pedal effort adjustment stopper 30 according to the embodiment of the present disclosure is adjusted to relieve the pedal effort.

Figure 4C:
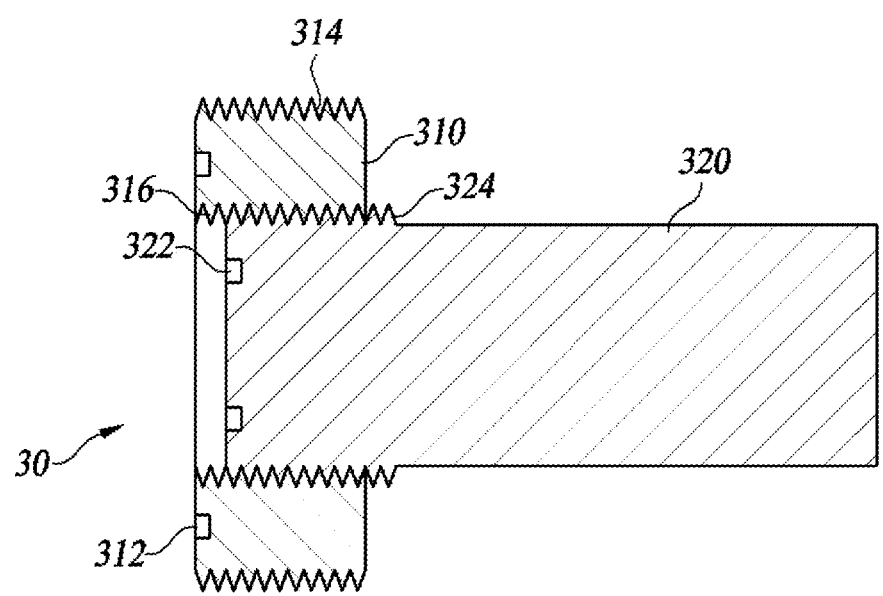
FIG. 4C shows another example in which the pedal effort adjustment stopper according to the embodiment of the present disclosure is adjusted to increase the pedal effort.

FIG. 4C shows another example in which the pedal effort adjustment stopper 30 according to the embodiment of the present disclosure is adjusted to increase the pedal effort.

Figure 5:
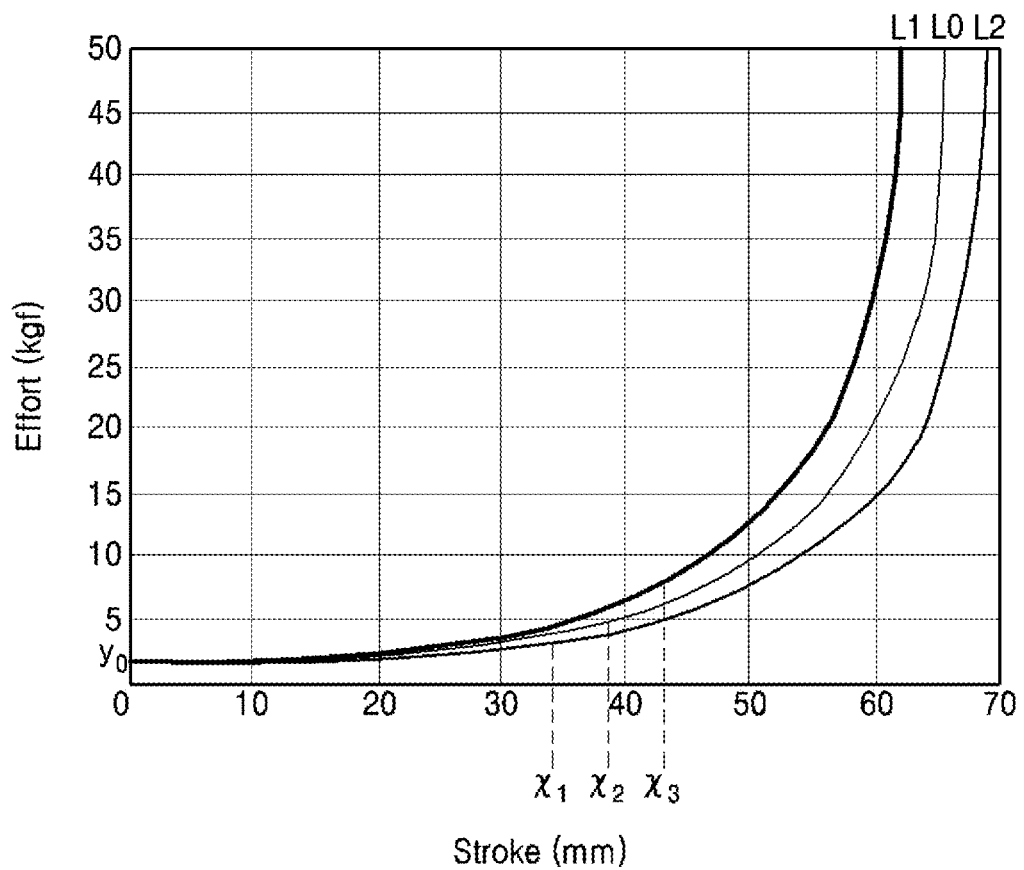
FIG. 5 is a graph depicting changes in pedal effort on a pedal when the pedal effort adjustment stopper is adjusted to the states shown in FIGS. 4A, 4B and 4C.

FIG. 5 is a graph depicting changes in pedal effort on a pedal when the pedal effort adjustment stopper 30 is adjusted to the states shown in FIGS. 4A, 4B, and 4C.

In the example of FIGS. 4A, 4B and 4C, the coupling body 310 is fixed to the reaction force cylinder 10, and only the pedal effort adjuster 320 is moved from the coupling body 310.

In FIG. 5, a pedal effort change curve L0 is obtained when the pedal effort adjustment stopper 30 is positioned as shown in FIG. 4A. That is, when the stroke according to rotation of the pedal is small, there is a section in which the pedal effort increases linearly with respect to the stroke due to the elastic force of the first elastic member and the second elastic member 136. Thereafter, when the stroke according to the rotation of the pedal reaches a point $x_2$ at which the reaction damper 138 starts to be compressed by the pedal effort adjuster 320, a section in which the pedal effort increases sharply with the respect to the stroke appears.

In addition, when the pedal effort adjustment stopper 30 is positioned as shown in FIG. 4B, a pedal effort change curve L2 is obtained. In the example of FIG. 4B, the pedal effort adjuster 320 is less inserted into the second pressure generator 130 than in the example shown in FIG. 4A. Accordingly, a point $x_3$ at which the reaction damper 138 starts to be compressed by the pedal effort adjuster 320 due to the stroke according to the rotation of the pedal is at a farther position than the point $x_2$ illustrated in FIG. 4A. In other words, it is located where a larger stroke is made. Thereby, a stroke-pedal effort curve represented by L2 in FIG. 5 is obtained.

When the pedal effort adjustment stopper 30 is positioned as shown in FIG. 4C, the pedal effort changes along curve L1 in the graph. In the example of FIG. 4C, the pedal effort adjuster 320 is inserted farther into the second pressure generator 130 than in the example shown in FIG. 4A. Accordingly, point $x_2$ at which the reaction damper 138 starts to be compressed by the pedal effort adjuster 320 due to the stroke according to the rotation of the pedal is at a closer position than the point $x_2$ illustrated in FIG. 4A, that is, positioned where a smaller stroke is made. Thus, a stroke-pedal effort curve represented by L1 in FIG. 5 is obtained.

As shown in FIG. 5, by adjusting the degree of insertion of the pedal effort adjuster 320 into the second pressure generator 130, the variation of the pedal effort to the pedal rotation felt by the driver, that is, the pedal feel may be easily adjusted.

In particular, according to the present disclosure, since the degree of insertion of the pedal effort adjustment unit 320 may be easily adjusted from the outside of the reaction force cylinder 10 using a simple mechanism, a pedal feel suitable for the driver's experience or preference may be easily provided. Furthermore, the pedal feel may be adjusted without the need to remove the reaction force cylinder 10 from the vehicle in a simple maintenance process.

In addition, according to the present disclosure, since the pedal effort adjustment stopper 30 does not require additional parts or additional space compared to the conventional brake device structure in its application, it is applicable to the existing electric brake device without affecting the overall configuration of the vehicle.

Figure 6A:
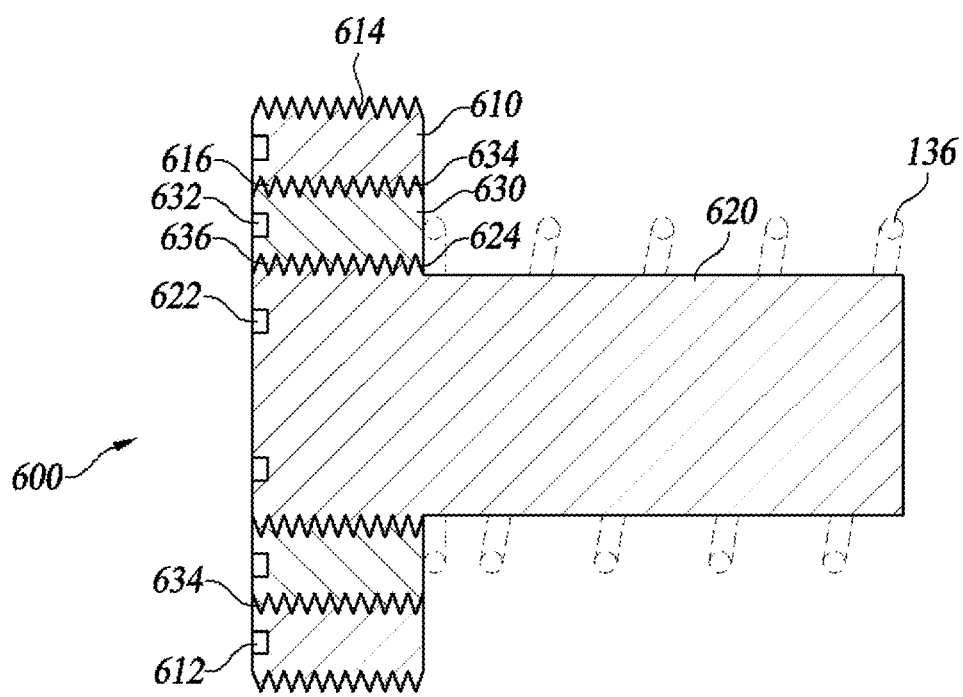
FIG. 6A is a cross-sectional view of a pedal effort adjustment stopper according to another embodiment of the present disclosure.

FIG. 6A is a cross-sectional view of a pedal effort adjustment stopper according to another embodiment of the present disclosure.

Figure 6B:
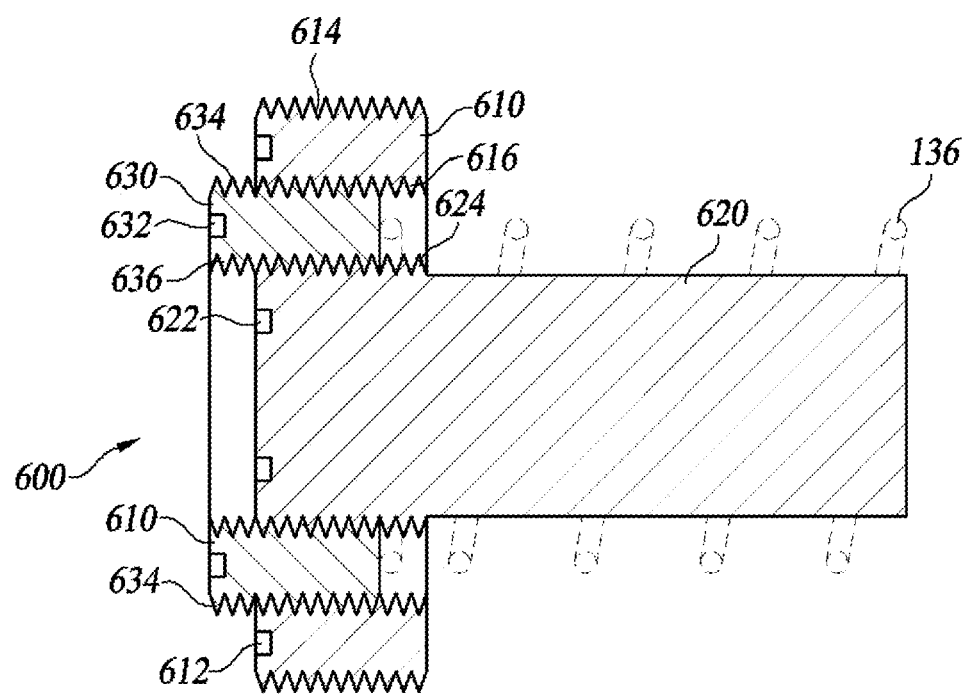
FIG. 6B shows an example in which the pedal effort adjustment stopper according to the embodiment of the present disclosure is adjusted to relieve the pedal effort.

FIG. 6B shows an example in which the pedal effort adjustment stopper according to the embodiment of the present disclosure is adjusted to relieve the pedal effort.

Figure 6C:
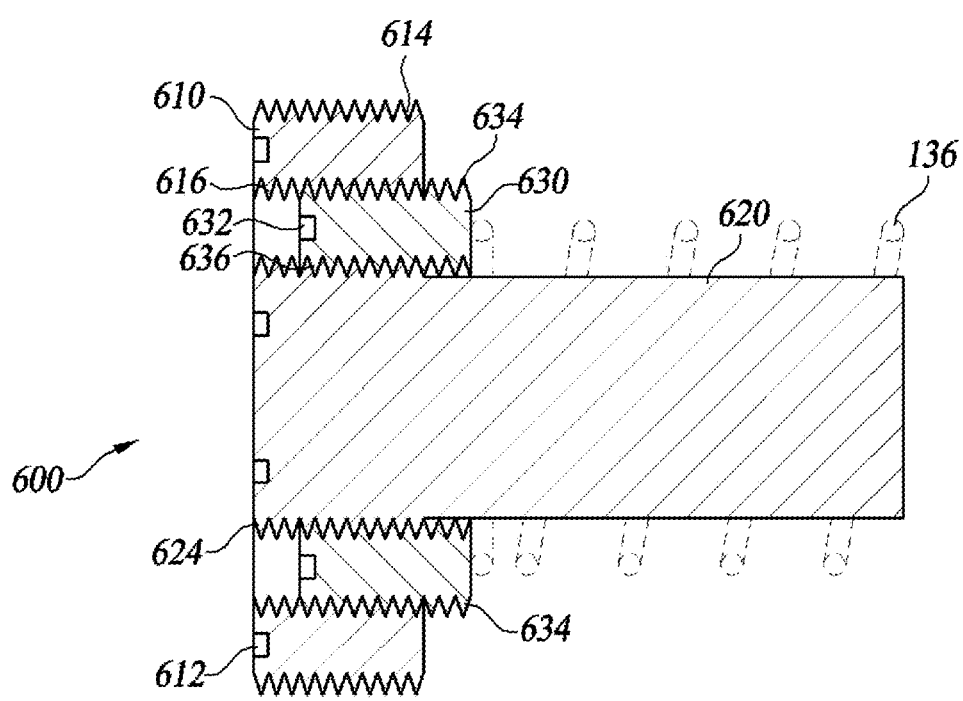
FIG. 6C shows another example in which the pedal effort adjustment stopper according to the embodiment of the present disclosure is adjusted to increase the pedal effort.

FIG. 6C shows another example in which the pedal effort adjustment stopper according to the embodiment of the present disclosure is adjusted to increase the pedal effort.

Figure 7:
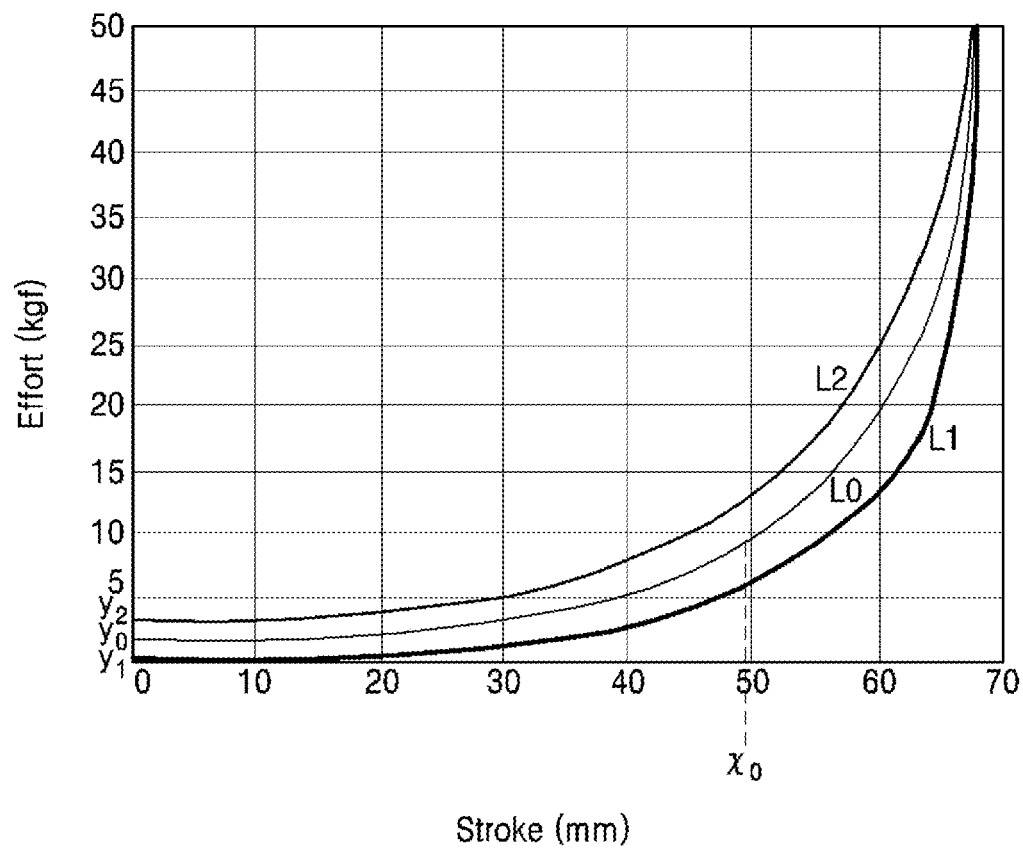
FIG. 7 is a graph depicting changes in pedal effort on a pedal when the pedal effort adjustment stopper is adjusted to the state shown in FIGS. 6A, 6B and 6C.

FIG. 7 is a graph illustrating a change in pedal effort when the pedal effort adjustment stopper is adjusted to the state shown in FIGS. 6A, 6B, and 6C.

Referring to FIGS. 6A, 6B and 6C, a pedal effort adjustment stopper 600 according to this embodiment differs from the previous embodiment in that includes the pedal effort adjuster includes two pieces 620 and 630. Hereinafter, a description will be given focusing on the difference in configuration of the pedal effort adjustment stopper 600 according to the other embodiment of the present disclosure, and a redundant description will be omitted.

In one example according to the other embodiment of the present disclosure, the pedal effort adjuster 620 of the pedal effort adjustment stopper 600 includes a first pedal effort adjuster 630 configured to be coupled to the coupling body 610, a second pedal effort adjuster 620 configured to be coupled to the first pedal effort adjuster 630.

The first pedal effort adjuster 630 may be formed in an annular shape having a circular fastening hole therein. The first pedal effort adjustment unit 630 includes first male threads 614 formed along an outer circumferential surface thereof and first female thread 616 formed along an inner circumferential surface thereof. The first pedal effort adjuster 630 may be screwed to body-side female threads formed on the inner circumferential surface of the coupling body 610.

In the illustrated embodiment, the second elastic member 136 of the second pressure generator 130 is supported on one surface of the first pedal effort adjuster 630.

In this embodiment of the present disclosure, the first pedal effort adjuster 630 includes an exposed surface at least partially exposed to the outside of the reaction force cylinder 10. The first pedal effort adjuster 630 further includes one or more third mechanism fasteners 632 formed on the exposed surface.

While the third mechanism fasteners 632 is illustrated in the embodiment as a plurality of circular grooves formed on the exposed surface of the first pedal effort adjuster 630, the present disclosure is not limited thereto. According to the present disclosure, the third mechanism fasteners 632 may be formed as protrusions, grooves, and a combination thereof formed on the exposed surface, and the shape thereof is not limited.

The second pedal effort adjuster 620 may have an elongated column shape, for example, a cylindrical shape, and includes second projection male threads 624 formed on at least a portion of the outer circumferential surface thereof. However, the present disclosure is not limited thereto, and the second pedal effort adjuster 620 may have a bolt shape having a T-shaped cross section. The second male threads 624 of the second pedal effort adjustment unit 620 may be screw-coupled to the first female threads 636 formed on the inner circumferential surface of the first pedal effort adjuster 630

In one embodiment of the present disclosure, the second pedal effort adjuster 620 includes an exposed surface at least partially exposed to the outside of the reaction force cylinder 10. In addition, the second pedal effort adjuster 620 includes one or more fourth mechanism fasteners 622 formed on the exposed surface.

While the fourth mechanism fasteners 622 is illustrated in the embodiment as a plurality of circular grooves formed on the exposed surface of the second pedal effort adjuster 620, the present disclosure is not limited thereto. The fourth mechanism fasteners 622 may be formed of protrusion, grooves, and a combination thereof, and the shape thereof is not limited.

The user may fasten the coupling body 610 to the reaction force cylinder 10 using the body-side fastening mechanism 612 of the coupling body 610, the third mechanism fasteners 632 of the first pedal effort adjuster 630, and the fourth mechanism fasteners of the second pedal effort adjuster 620, and may independently adjust the degree of insertion of the first pedal effort adjuster 630 and the second pedal effort adjuster 620 into the second pressure generator 130.

In the example of FIGS. 6A, 6B and 6C, the coupling body 610 is fixed to the reaction force cylinder 10, and the second pedal effort adjuster 620 is maintained at the same position while only the first pedal effort adjuster 630 is moved.

In FIG. 7, a pedal effort change curve L0 is obtained when the pedal effort adjustment stopper 600 according to the other embodiment of the present disclosure is positioned as shown in FIG. 6A. That is, when the stroke according to rotation of the pedal is small, there is a section in which the pedal effort increases linearly with respect to the stroke due to the elastic force of the first elastic member and the second elastic member 136. However, in this case, in the initial state, an initial pedal effort value $y_0$ corresponding to the degree of compression of the second elastic member 136 is required. In order to rotate the pedal, that is, in order to achieve the stroke of the first piston and the second piston, force that exceeds the initial value $y_0$ should be exerted. Thereafter, when the stroke according to the rotation of the pedal reaches a point $x_0$ at which the reaction damper 138 starts to be compressed by the second pedal effort adjuster 620, a section in which the pedal effort increases sharply with the respect to the stroke appears.

In addition, when the pedal effort adjustment stopper 600 according to the other embodiment of the present disclosure is positioned as shown in FIG. 6B, a pedal effort change curve L1 in FIG. 7 is obtained. In the example of FIG. 6B, the first pedal effort adjuster 630 is less inserted into the second pressure generator 130 than the first pedal effort adjuster 630 shown in FIG. 6A. Accordingly, in the initial state, an initial pedal effort value $y_1$ corresponding to the degree of compression of the second elastic member 136 is less than the initial pedal effort value $y_0$ shown in FIG. 6A.

In the example of FIG. 6B, the initial position of the second pedal effort adjuster 620 is the same as that in FIG. 6A. Accordingly, the point $x_0$ at which the reaction damper 138 starts to be compressed by the second pedal effort adjuster 620 due to a stroke according to the rotation of the pedal will be the same as the point $x_0$ illustrated in FIG. 6A, and a stroke-pedal effort curve represented by L1 in FIG. 7 may be obtained.

When the pedal effort adjustment stopper 600 according to the other embodiment of the present disclosure is positioned as shown in FIG. 6C the pedal effort changes along curve L2 in the graph of FIG. 7. In the example of FIG. 6C, the first pedal effort adjuster 630 is inserted farther into the second pressure generator 130 than in the example shown in FIG. 6A. Accordingly, in the initial state, the initial pedal effort value $y_2$ corresponding to the degree to which the second elastic member 136 is compressed is greater than the initial pedal effort value $y_0$ shown in FIG. 6A.

In the example of FIG. 6C, the initial position of the second pedal effort adjuster 620 is the same as that in FIG. 6A. Accordingly, the point $x_0$ at which the reaction damper 138 starts to be compressed by the second pedal effort adjuster 620 due to a stroke according to the rotation of the pedal will be the same as the point $x_0$ illustrated in FIG. 6A, and a stroke-pedal effort curve represented by L2 in FIG. 7 may be obtained.

Although not shown in the figure, the degree of insertion of the first pressure generator 120 into the second pressure generator 130 may be adjusted independently of the first pressure adjuster. Accordingly, in the initial state, the distance between an end portion of the first pressure generator 120 and the reaction damper 138 or the degree of compression thereof may be separately adjusted.

That is, by adjusting the degrees of insertion of the first pedal effort adjuster 610 and the second pedal effort adjuster 620 into the second pressure generator 130, respectively, the pedal effort generated by the second elastic member 136 such as a spring and the pedal effort generated by the reaction damper 138 made of a compressive material such as rubber may be adjusted, respectively. This means that the pedal feel felt by the driver may be adjusted more precisely in a wider range.

Accordingly, although the pedal feel may differ among vehicle models according to the pedal structure and size, the electric brake device according to the present disclosure may implement an appropriate pedal feel for different vehicle models with the same module.

While this invention has been described in conjunction with the various exemplary embodiments outlined above, it will be appreciated by those of ordinary skill in the art that various modifications and equivalent other embodiments are possible. In addition, although the electric brake device used in vehicles has been described as an example, this is merely exemplary. The electric brake device according to the present disclosure may be used even for a brake device installed in an apparatus other than a vehicle.

What is claimed is:

1. An electric brake device comprising:
   a reservoir configured to store brake oil;
   a reaction force cylinder fluidically communicating with the reservoir and configured to change a pedal effort and a pressure of the brake oil in operative connection with a movement of a pedal;
   a wheel brake mechanism configured to restrain rotation of wheels of a vehicle in connection with the operation of the reaction force cylinder; and
   a pedal effort adjustment stopper configured to adjust a change in magnitude of the pedal effort according to the movement of the pedal, the pedal effort adjustment stopper comprising:
   a coupling body mounted on at least one side of the reaction force cylinder, the coupling body is formed in an annular shape to have a body fastening hole therein; and
   one or more pedal effort adjusters connected to the coupling body and movable in a longitudinal direction of the reaction force cylinder, the one or more pedal effort adjuster comprises:
   a first pedal effort adjuster configured to be coupled to the coupling body, the first pedal effort adjuster is screw-coupled to the body fastening hole of the coupling body, and the first pedal effort adjuster is formed in an annular shape to have a circular fastening hole therein; and
   a second pedal effort adjuster configured to be coupled to the first pedal effort adjuster, the second pedal effort adjuster is screw-coupled to the circular fastening hole of the first pedal effort adjuster, and the second pedal effort adjuster is at least partially formed in an elongated columnar shape.

2. The electric brake device of claim 1, wherein the reaction force cylinder comprises:
   a hollow main cylinder having an operation space;
   a first pressure generator positioned inside the main cylinder and configured to pressurize an internal brake oil in connection with operation of the pedal; and
   a second pressure generator arranged adjacent to the first pressure generator inside the main cylinder and configured to pressurize the internal brake oil in connection with movement of the first pressure generator,
   wherein the pedal effort adjustment stopper is at least partially inserted into the second pressure generator.

3. The electric brake device of claim 2, wherein the first pressure generator comprises:
   a first piston configured to linearly move along an inner side of the main cylinder in operative connection with linear movement of a pedal rod hinged to the pedal; and
   a first elastic member arranged between the first piston and the second pressure generator and configured to elastically support the first piston,
   wherein the second pressure generator comprises:
   a second piston configured to support the first elastic member and linearly move along the inner side of the main cylinder;
   a second elastic member supported on at least a portion of the pedal effort adjustment stopper and configured to elastically support the second piston; and
   a reaction damper mounted on the second piston and arranged between the second pedal effort adjuster and the second piston to form a reaction force against movement of the second piston.

4. The electric brake device of claim 1, wherein the coupling body comprises body-side male threads formed along an outer circumferential surface thereof, and
   wherein, when the coupling body is inserted into a cylinder-side fastening hole formed at one end of the reaction force cylinder, the body-side male threads of the coupling body are screw-coupled to cylinder-side female threads of the reaction force cylinder.

5. The electric brake device of claim 4, wherein the coupling body further comprises body-side female threads formed along an inner circumferential surface thereof,
   wherein the second pedal effort adjuster comprises adjuster-side male threads formed on at least a part of an outer circumferential surface thereof, and
   wherein, when the first pedal effort adjuster is inserted into the body fastening hole of the coupling body, the body-side female threads of the coupling body are screw-coupled to the adjuster-side male threads of the first pedal effort adjuster.

6. The electric brake device according to claim 1, wherein the coupling body or the one or more pedal effort adjusters includes:
   an exposed surface at least partially exposed to an outside of the reaction force cylinder; and
   at least one of a groove and a protrusion formed on the exposed surface.

7. The electric brake device of claim 1, wherein each of the coupling body and the second pedal effort adjuster includes an exposed surface at least partially exposed to an outside of the reaction force cylinder, and wherein the coupling body comprises a first adjustment mark located on the exposed surface of the coupling body, and the second pedal effort adjuster comprises a second adjustment mark located on the exposed surface of the second pedal effort adjuster.

8. The electric brake device of claim 7, wherein the first adjustment mark is formed as measurement markings arranged along at least one circle.

* * * * *